United States Patent [19]
Linton

[11] 3,957,519
[45] May 18, 1976

[54] ACID AND HEAT-RESISTANT MORTARS FOR CELLULAR GLASS COMPOSITIONS AND PRODUCTS THEREFROM

[75] Inventor: Robert W. Linton, Export, Pa.

[73] Assignee: Pittsburgh Corning Corporation, Pittsburgh, Pa.

[22] Filed: May 31, 1974

[21] Appl. No.: 475,118

[52] U.S. Cl. .................................. 106/85; 106/69
[51] Int. Cl.² ........................................ C04B 35/66
[58] Field of Search ........................... 106/69, 85

[56] References Cited
UNITED STATES PATENTS 2,995,453   8/1961   Noble et al. .......................... 106/69
3,024,125   3/1962   Lee ...................................... 106/69

*Primary Examiner*—J. Poer
*Attorney, Agent, or Firm*—Stanley J. Price, Jr.

[57] ABSTRACT

Acid-resistant mortar compositions and selected products bonded therewith are provided wherein the mortar composition comprises a major portion of a cellular boro silicate glass powder, a silica sol, and a setting or hardening agent. Mortars of the invention are especially useful in bonding cellular glass bodies having a composition substantially identical to the boro silicate glass powder to provide bonded product arrays having excellent thermal shock characteristics.

6 Claims, No Drawings

ACID AND HEAT-RESISTANT MORTARS FOR CELLULAR GLASS COMPOSITIONS AND PRODUCTS THEREFROM

BACKGROUND OF THE INVENTION

1. Field of the Invention

This invention relates to the bonding of cellular glass bodies and more particularly to a bonded cellular glass body system and mortar therefor wherein the mortar comprises a substantial portion of a glass powder having a composition substantially comparable to that of the cellular glass being bonded.

2. Description of the Prior Art

Acid-resistant mortars and coatings for insulating systems are well known in the art. Such mortars are generally employed in bonding insulating systems which are exposed to cyclic acidic environments. For example, in an industrial smoke stack, as in a coal burning power plant, a brick lining has been employed which brick lining was bonded with an acid-resistant silicate containing mortar. The mortar and brick were acid resistant in order to avoid damage due principally to the presence of sulfuric acid formed by hydrolysis of sulfur oxides in the stack gases.

The early acid-resistant mortars comprised wet mixtures of silica sand and sodium silicate which were cured by evaporation and exposure to acid, either as a wash, or while in service. An important development was the use of a setting agent to gel or partially gel the silicate so that mortar strength developed rapidly to permit continuous laying of brick. Additionally, the use of setting agents eliminated the need for acid washes.

Silica sol based mortars have found limited use because of the cost and poor workability. They have been used where cations are not wanted or better weatherability is desired. The present silica sol based mortars use an alkaline silicate glass as a setting agent to raise the pH and destabilize the sol. All the foregoing mortars were developed to bond dense acid-resistant brick systems and did perform very well. Brick densities were in the order of 140 pounds per cubic foot which insured sufficient pressure on the motor joint to promote a good bond. Moreover, the linear coefficients of thermal expansion of brick and prior art mortars were comparable (ca. $7-9 \times 10^{-6}$ in/in/°F.) so as to minimize spalling and thermal shock failures.

More recently, however, superior insulation compositions have been developed, particularly in the area of cellular glass type compositions. For example, cellular borosilicate glass compositions in the form of blocks or slabs have been developed which are acid resistant and which have excellent insulating properties. The cellular silicates, however, differ substantially from bricks in both physical and thermal characteristics. The cellular boro-silicate glasses have a density of only about 9 – 15 pounds per cubic foot and while being an important advantage from one standpoint, that density does not provide sufficient joint pressure to proivde a good bond with prior art mortars. Moreover, a cellular boro-silicate glass composition may typically have a linear coefficient of thermal expansion of about $1.6 \times 10^{-6}$ in/in/°F., far lower than that of bricks or prior art mortars. The low coefficient is again desirable from an application standpoint, but causes bond failures with existing mortars. Additionally, the surface of cellular glasses is not easily wet and it is difficult to "key" mortars into irregularities in the surface as there is almost no surface porosity to encourage formation of a strong glass body/mortar bond. Also, potassium or sodium silicate cements cause severe shear or failure of the bond between cellular glass bodies.

Accordingly, there is a need for acid resistant compositions useful in bonding cellular glass bodies such as bodies of cellular boro-silicate compositions. Moreover, there is a need for a mortar of the type described that is able to provide a bonded system having good thermal shock characteristics. Additionally, there is a need for acid resistant mortar compositions having thermal shock characteristics compatible with those of cellular glass boides so as to readily provide an efficient bonded glass body system useful in an acid environment. Further, there is a need for acid resistant mortar compositions that avoid shearing or failure of the bond between cellular glass bodies.

This invention provides acid resistant mortar compositions and cellular glass body systems bonded therewith which overcome the disadvantages of known mortars and systems and will be further understood as the specification proceeds.

SUMMARY OF THE INVENTION

This invention provides acid-resistant mortar compositions and selected products bonded therewith wherein the mortar composition comprises a major portion of a cellular boro silicate powder, a silica sol, and a setting or hardening agent. The cellular silicate glass powder, useful in the invention preferably comprises a finely ground powder of a cellular boro silicate glass, and preferably comprises a powder of that type having a tamped bulk density of greater than about forty pounds per cubic foot and a particle size of greater than about 50 percent by weight passing through a standard U.S. No. 200 Screen. The ground powder is present in an amount of greater than about 50 percent and preferably about 55 – 60 percent by weight in mortar compositions of the invention.

A colloidal silica solution, or silica sol, binding agent is employed in mortar compositions according to the invention in an amount of from about 35 – 45 percent by weight of said compositions, usually about 40 percent by weight.

In addition to the foregoing a hardening agent is present in compositions according to the invention and may comprise 1 – 3 percent, preferably about 2.0 percent by weight of compositions. The hardener, or curing agent, may comprise any slowly hydrolyzable acidic material in the case where the silica sol binder is alkaline or a slowly hydrolyzable alkaline material where the silica sol is acidic.

In most preferred mortar compositions, according to the invention, a wetting agent is additionally present to aid in application of those mortars to cellular glass bodies for forming bonded arrays of those cellular glass bodies. Such bonded arrays are acid-resistant, have excellent thermal insulation properties, good mechanical strength properties and are highly thermal shock resistant. The excellent thermal shock resistance is believed to be due to the use of mortar compositions according to the invention which comprise a major portion of a finely ground cellular glass having a composition substantially the same as the cellular glass bodies being bonded together.

Other advantages and details of the invention will become apparent as the following more detailed description thereof proceeds.

DETAILED DESCRIPTION

This invention provides acid resistant mortar especially useful for bonding cellular glass bodies such as cellular boro-silicate glass bodies. Cellular glass compositions are known compositions and generally comprise glass compositions having a cellular internal structure. Such compositions are valuable insulating compositions and are prepared by melting glass forming substances and molding them, as by extrusion, into rod or tube shape. The molded glass compositions are thereafter finely ground to provide a glass powder. The powder is admixed with a cellulating agent, usually comprising about 0.1 – 2 percent carbon and 0.5% antimony oxide. The admixture is thereafter heated to re-melt temperatures whereat the glass melts as the cellulating agent decomposes or gasifies to create a cellular mass. The cellular glass mass is thereafter allowed to cool to solidification in desired forms and finally cut or sawed into cellular glass bodies of particular required dimensions.

Some most useful cellular glass type compositions, from the standpoint of thermal stability and insulating qualities, comprise the boro silicate cellular glass, or cellular silicate, compositions. Such compositions may typically comprise, on a batch weight basis, about 7 – 20 percent $B_2O_3$, about 75 – 80 percent silica and about 2 – 10 percent fluxing agent such as $K_2O$. The compositions may additionally include some aluminum oxide ($Al_2O_3$). The compositions may be cellulated as hereinabove described to provide superior insulating compositions. A particularly useful cellular silica composition has been found to be that formed of a boro-silicate glass having the composition 79.2% $SiO_2$, 18.4% $B_2O_3$ and 2.4% $K_2O$. However, this and other boro-silicate glass formed cellular bodies are not satisfactorily bonded with conventional known mortars. Accordingly, most preferred compositions, according to the invention, comprises a mortar for bonding such cellular bodies and bonded arrays thereof.

Mortar compositions, according to the invention, comprise a major portion of a cellular glass powder having a composition substantially similar to that of the cellular glass being bonded. The cellular glass powders are finely ground and are prepared by grinding previously cellulated glass bodies. It is most preferred that the glass powders comprise a major portion of very fine particles, e.g. greater than about 50 percent passing through a U.S. Standard No. 200 screen. Most preferably, greater than about 50 percent pass through a U.S. Standard No. 325 screen. As is the case with all mortars the exact final compositions may vary somewhat with the particle size distribution of the powder but it has been found with finely ground cellular glass powders useful in the invention that a major portion of the mortar, i.e., greater than about 50 percent, and, preferably, about 55 – 60 percent by weight of the mortar may comprise glass powder. However, some experimentation may be necessary to optimize mortar composition depending on the size and chemical composition of the particular cellular glass powder employed.

Acid-resistant mortar compositions of the invention further include a silica sol binder to set or gel the mortar. The silica sol may comprise about 35 – 45 percent, and usually about 40 percent, by weight of the mortar. Suitable silica sol compositions may comprise the comercially available colloidal silica solutions which typically include about 40 percent by weight $SiO_2$. One suitable sol is the DuPont Chemical Co. sol known as LUDOX HS-40 which has the following properties:

LUDOX HS - 40

| Stabilizing Ion | Sodium |
|---|---|
| Particle size mu. | 13 – 14 |
| $SiO_2$, wt. % | 40 |
| pH | 9.7 |
| $Na_2O$ (titrated) | 0.43 |
| $SiO_2/Na_2O$ ratio | 90 |

Another suitable sol is that designated LUDOX-AS which is similar to HS-40 but includes ammonia in place of sodium as a counter ion.

Mortar compositions of the invention include a slowly hydrolizable acidic or alkaline material hardening agent to harden or cure the mortar after application to a cellular glass body. The hardeners may comprise conventional known hardeners such as sodium silicofluoride and an acidic aluminum phosphate (cf. U.S. Pat. No. 3,445,257). Hardeners are present in the mortar generally in an amount of from about 1 – 3 percent by weight, but that amount may vary with the particular hardener employed.

In most preferred mortar compositions, according to the invention, a wetting agent is employed to aid in trowelability. Usually a commerical surfactant in an amount of about 0.1 percent by weight of mortar is sufficient. An excess can cause a foaming problem. Typical well known commerical surfactants are suitable such as Dowfax 2A1(Dow Chemical Co.) and Triton X-100 (Rohm & Haas Co.).

The invention will be further understood and illustrated by reference to the following Examples wherein all parts are by weight unless otherwise indicated.

EXAMPLE I

In all cases mortars of the invention like conventional mortars are prepared by simple admixture of the components. For example, a mortar may be prepared by simply blending in a pot cellular glass powder and the desired amount of bonding agent to which is added at the time of use the silica sol. A wetting agent may be added to either the blend or to one of the constituents thereof, such as the silica sol.

To cellular silica blocks measuring 1⅜ × 2 7/16 × 8 13/16 inches were applied coatings of two commercially available silica mortars. The cellular silica blocks were prepared as hereinabove described and had the composition 79.2% $SiO_2$, 18.4% $B_2O_3$ and 2.4% $K_2O$. A mortar coating of about ⅛ inches thickness of a first commercially available single pot sodium silicate mortar with a silica sand filler was applied to the cellular silica blocks. The mortar was prepared as per manufacturer's recommendations. Assembled mortar bearing blocks were dried at room temperature then slowly heated to 212°F. The temperature was thereafter increased to 752°F. and allowed to cool to room temperature. The 752°F. cycle was repeated to failure of the coating. It was noted that the mortar failed at the interface between mortar and glass body after only two cycles, indicating poor adhesion of the mortar to the glass body.

The foregoing procedure was repeated with a commerical two-part potassium silicate mortar. Again the mortar was prepared to manufacturer's recommendations. The cycle heating to 752°F. was repeated and failure at the interface was noted after only one cycle, again indicating lack of bonding of mortar to cellular glass body.

The foregoing procedure was repeated with a mortar comprising 57.5 percent finely ground glass powder formed from the cellular glass bodies of the Example, 40.0 percent of the colloidal silica solution LUDOX HS-40 (described hereinabove), and 2.4 percent sodium silicofluoride. The constituents were made into a mortar by simple admixing thereof. Samples of the cellular glass bodies bearing mortar were prepared as above and thereafter subjected to cyclic heating to 400°F. No failure of mortar was noted. The heating cycle was then increased to 900°F. and no mortar or body failure was noted even after four cycles. Thus the ability of the mortar containing a major portion of finely ground cellular glass powder having a composition as that of the cellular bodies being bonded and low sodium or potassium was demonstrated. It was further found that an array of such bonded bodies exhibited excellent acid resistance, has good mechanical strength and excellent resistance to thermal shock.

EXAMPLE II

Cellular silica bodies as described in Example I were coated with mortars identical except for the fact that a first mortar contained 57.5 percent cellular glass powder having a particle size all in excess of U.S. Standard No. 200 screen size, while the second contained the identical powder having a particle size of greater than 50 percent passing through a U.S. Standard No. 325 screen. The remaining components comprises 40 percent silica sol and 2.4 percent sodium silicofluoride. It was noted that the larger particle size powder yielded a mortar which failed at room temperature while the smaller particle size power yielded a mortar which performed equally as well as that glass powder-containing mortar of Example I.

The foregoing has described the invention and certain preferred embodiments thereof. It is to be understood however that the invention is not necessarily limited to the precise embodiments described therein but may be variously practiced within the scope of the following claims.

I claim:

1. An acid-resistant mortar composition for bonding cellular glass bodies comprising more than 50 percent by weight of a finely ground boro silicate cellular glass powder, said cellular glass powder having substantially the same composition as said cellular glass bodies, between about 35 and 40 percent by weight of a silica sol binder, and between about 1 and 3 percent by weight of a hardening agent selected from the group consisting of slowly hydrolyzable acidic and alkaline materials.

2. The acid-resistant mortar composition as set forth in claim 1 wherein said finely ground boro silicate cellular glass powder comprises from about 55 – 60 percent by weight of said mortar compositions.

3. The acid-resistant mortar composition as set forth in claim 1 wherein said silica sol binder comprises about 40 percent by weight of said mortar composition.

4. The acid-resistant mortar composition as set forth in claim 1 wherein said finely ground boro silicate cellular glass powder has a particle size whereby greater than about 50 percent by weight of said powder particles pass through a U.S. Standard No. 200 screen.

5. The acid-resistant mortar composition as set forth in claim 1 wherein said cellular boro silicate powder glass composition comprises about 75 – 80 percent by weight silica, about 7 - 20 $B_2O_3$, and about 2 – 10 percent by weight fluxes.

6. The acid-resistant mortar composition as set forth in claim 4 wherein said cellular boro silicate glass powder composition comprises about 79.2 percent by weight $SiO_2$, about 18.4 percent $B_2O_3$, and about 2.4 percent by weight $K_2O$.

* * * * *